Patented Jan. 26, 1954

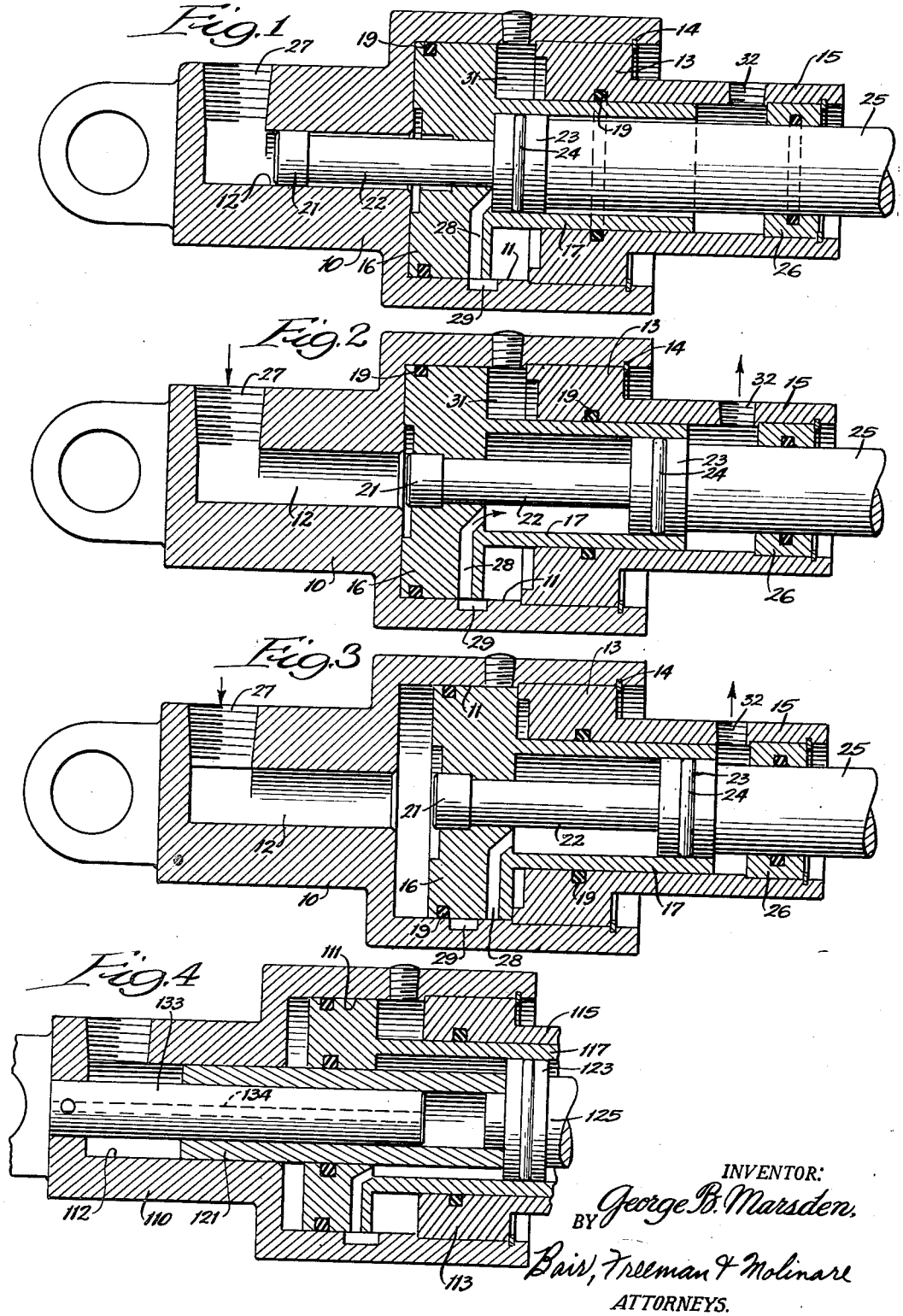

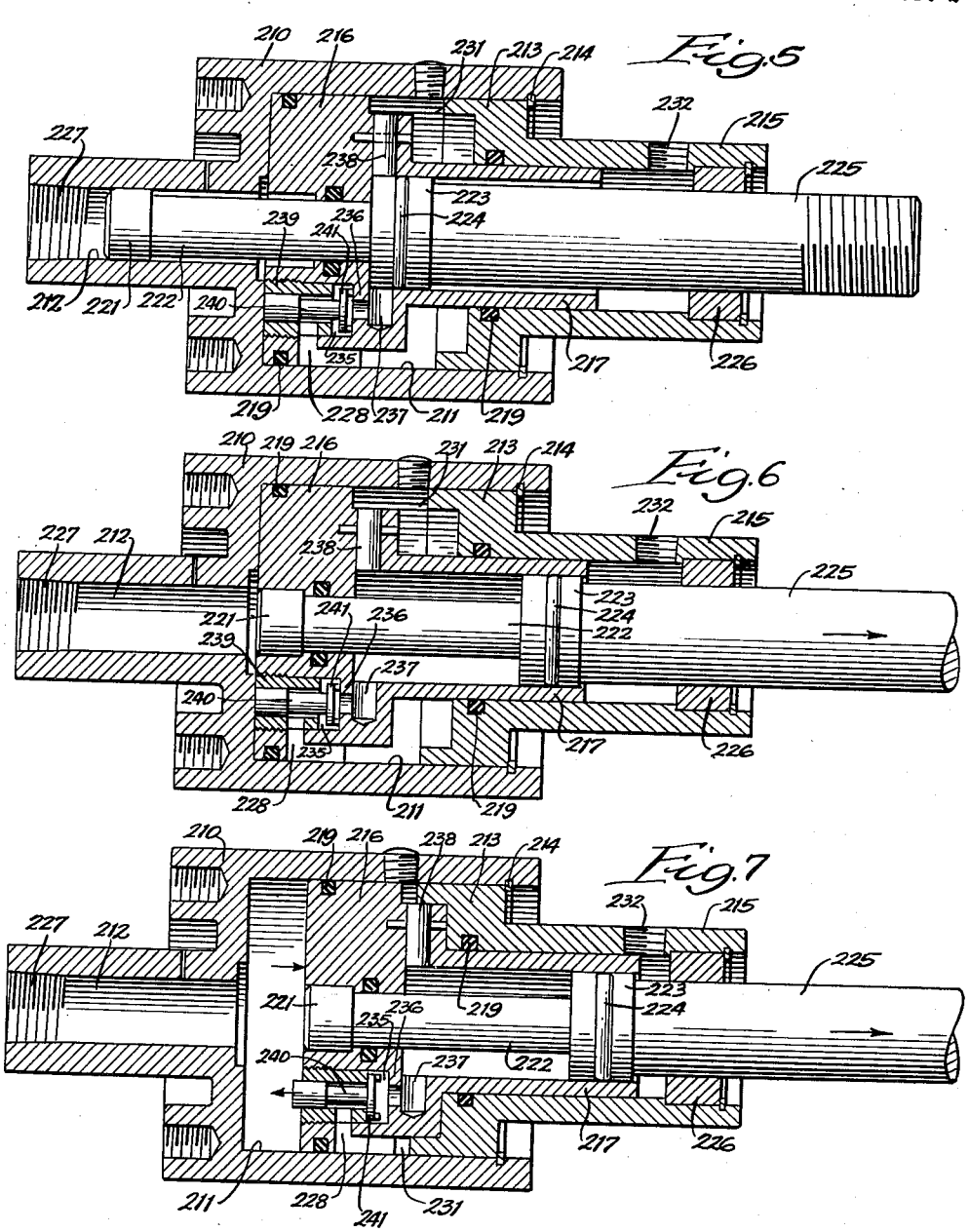

2,667,035

UNITED STATES PATENT OFFICE 2,667,035

DIFFERENTIAL CYLINDER

George B. Marsden, Cicero, Ill., assignor to Chicago Nipple Manufacturing Company, Cicero, Ill., a corporation of Delaware Application February 16, 1953, Serial No. 337,157

12 Claims. (Cl. 60—97)

This invention relates to a differential cylinder and more particularly to a fluid-operated cylinder and piston device to produce a rapid initial movement with a relatively low force followed by a slower movement with a relatively high force.

For many types of operations it is desirable to produce a relatively rapid initial feeding movement against a small resistance followed by a slower and more powerful working movement. For example, in carrying workpieces to a machine head or in carrying tools to a workpiece, it is desirable to move the workpiece or tool rapidly to its working position and thereafter to feed it slowly during the actual working operation. It is also desirable in such operations to provide a rapid return movement.

It is one of the objects of the present invention to provide a differential cylinder which will produce a rapid initial movement followed by a slower feeding movement in response to the delivery of operating fluid at a substantially constant volume and pressure.

Another object is to provide a differential cylinder in which a rapid return movement is produced by a reversal in the direction of flow of the operating fluid.

Still another object is to provide a differential cylinder in which the initial movement is produced by a relatively small piston moving relative to a larger piston and the working movement is produced by the larger piston which is operatively connected to the smaller piston during working.

According to one feature of the invention the larger piston is connected to the smaller piston by trapping a volume of liquid in an expansible chamber between the pistons. In a preferred construction, liquid is supplied to the expansible chamber through a bore which is cut off by the larger piston after initial movement thereof.

A further object is to provide a differential cylinder in which the return movement is effected by fluid pressure acting against relatively small piston areas connected to both the larger and the smaller pistons.

The above and other objects and features of the invention will be more readily apparent from the following description when read in connection with the accompanying drawing, in which:

Figure 1 is a central section through a differential cylinder embodying the invention showing the parts in the starting position;

Figures 2 and 3 are similar views, showing progressively different positions of the parts;

Figure 4 is a partial section similar to Figure 1 of an alternative construction; and Figure 5, 6 and 7 are views similar to Figures 1, 2 and 3, respectively, of still another embodiment.

The cylinder, as shown in Figures 1 to 3, comprises a body 10 which may be cast or which may be formed in any other desired manner to provide a relatively large cylindrical bore 11 and a smaller cylindrical bore 12 coaxially aligned with the bore 11. The bore 11 is preferably closed by an annular closure plate 13 fitting into one end of the bore against an internal shoulder therein and secured in place by a snap ring 14. The closure plate 13 is formed with a tubular cylindrical extension 15 for the purpose to appear more fully hereinafter.

The large or first bore 11 slidably receives a first piston 16 which is provided with a tubular projection 17 fitting slidably through the closure plate 13 and into tubular extension 15. Suitable sealing means such as O rings 19 may be provided in the piston 16 and in the annular closure 13 to seal the surfaces against passage of fluid.

The smaller or second bore 12 receives a second piston 21 which fits slidably therein and which is provided with an extension rod 22 extending slidably through the first piston 16. At its outer end the rod 22 carries an annular piston 23 fitting slidably in the tubular projection 17 and sealed thereagainst by a seal 24. Beyond the annular piston 23 the extension continues as a rod 25 extending through the projection 15 and sealed therein by a ring 26. The rod 25 is adapted to be connected to the load to be moved such as a carriage to be moved toward a machine head to carry a workpiece toward the head. It will be apparent that this type of load is cited as typical of the types of service to which the present invention is applicable and is in no way to be taken as a restriction on the use thereof.

In the initial or retracted position of the parts as shown in Figure 1 both of the pistons 16 and 21 are moved to their extreme lefthand position with the annular piston 23 close to the piston 16. For the initial stage of movement operating fluid is supplied to the left end of the bore 12 through an inlet opening 27 to act on the small piston 21 and urge it to the right. During the initial portion of the movement the load resistance will be relatively small so that the force exerted by the small piston will be sufficient to move it. This initial stage of operation will continue until the small piston is moved completely out of the bore 12 as shown in Figure 2. At this time the working portion of the movement is taken up and the piston 16 is exposed to pressure from the inlet 27 so that it is effective to move the load.

In order to connect the pistons 16 and 22 during the working portion of the load it is contemplated that liquid will be trapped in the projection 17 behind the annular piston 23. For this purpose the piston 16 is formed with a passage 28 terminating at its periphery and opening into the projection 17 radially beyond the extension 22. The outer end of the passage 28 cooperates with a port 29 in the sidewall of the bore 11 to connect the passage to a liquid storage space 31 in the bore 11 around the projection 17. As the piston 21 moves from the position of Figure 1 to that of Figure 2, liquid will be drawn from the space 31 through the port 29 and passage 28 into the projection 17.

As soon as the first piston 16 is moved by the operating pressure the forward edge thereof will cut off the port 29 and will trap liquid in the projection 17 back of the annular piston 23. As the first piston continues to move to the position shown in Figure 3, it will be operatively connected through the trapped liquid to the second piston and the extension thereof so that the force of the first large piston will be exerted through the annular piston 23 on the rod 25. The rod will therefore be moved at a slower rate but with a much greater force due to the area of the piston 16 to move a relatively heavy load.

To return the parts to their initial position an inlet 32 for operating liquid is provided in the extension 15 to the right of the annular piston 23. During the forward movement of the parts as described above this opening is preferably connected to a return line so that liquid can be forced therefrom. For return movement, the connections are reversed so that the opening 32 is connected to a pressure source and the opening 27 is connected to a return line.

Pressure of operating fluid entering the opening 32 acts on the annular piston 23 and on the end of the tubular projection 17 to move both of the pistons rapidly to the left to their initial position, as shown in Figure 1. The parts are then ready for a subsequent operation.

When it is desired to have the areas of the small pistons relatively small and to provide a relatively small volume in the projection 17, the construction as shown in Figure 4 is preferably employed. This construction wherein parts corresponding to like parts in Figures 1 to 3 are indicated by the same reference numerals plus 100, enables relatively small piston areas to be provided without making the parts so small as to be difficult to manufacture or overly delicate in use.

In this construction the piston 121 is in the form of a tube which fits slidably in the bore 112 and which carries the annular piston 123. This tube can be made of relatively large external diameter but can be relatively thin walled so that its effective piston area will be small. A rod or plunger 133 is secured to one end of the body 110 and projects slidably into the tubular piston 121 as shown. If desired, the rod 133 may be drilled as indicated at 134 to vent the space on the interior of the piston 121.

This construction functions in exactly the same way as that of Figures 1 to 3 except that the exposed area of the piston 121 may be relatively small and the space between this piston and the projection 117 may also be relatively small without making the parts of extremely small size.

The construction of Figures 5, 6 and 7 is substantially similar to that of Figures 1, 2 and 3 except that a different type of valving is employed. For brevity of description, parts in Figures 5, 6 and 7 corresponding to like parts in Figures 1, 2 and 3 are designated by the same reference numerals plus 200.

In the construction of Figures 5, 6 and 7 the large piston 216 is formed with a bore 235 terminating in an annular shoulder 236. An intersecting bore 237 connects the bore 235 beyond the shoulder 236 to the interior of the tubular projection 217 and the passage 228 connects the bore 235 ahead of the shoulder 236 to the liquid storage space 231. For convenience, the bore 237 may be drilled diametrically through the piston 216 to the bore 235 and may have its outer end closed by a plug 238.

A valve sleeve 239 is fastened in the bore 235 and terminates at its inner end in a valve seat. A valve 240 is slidable in the sleeve 239 and is formed with a reduced stem to project beyond the face of the piston 216 and with an enlarged head 241 to seat against the valve sleeve. The outer face of the head 241 may be provided with spacing lugs as shown to prevent the head from sealing against the annular shoulder 236.

With the parts in their starting position as shown in Figure 5, the stem of valve 240 will engage the end of the cylinder 211 and hold the valve open. When pressure is supplied through the connection 227 to move the small piston to the right toward the position of Figure 6, the valve will remain open so that liquid can flow from the storage space 231 through the passage 228, past the valve and through the bore 237 into the tubular projection 217 to the left of the piston 223.

Upon initial movement of the large piston 216 in the working stroke toward the position of Figure 7 the valve stem is released and the head 241 seats on the sleeve 239. Liquid in the projection 217 is therefore trapped so that the large piston 216 is effective to move the rod 225.

For the return movement fluid is supplied through the connection 232 to the right side of piston 223 to move this piston and the rod 225 to the left. The valve 240 remains closed during this movement so that piston 216 will be moved through the trapped fluid until the end of the valve stem strikes the end of the cylinder 211. As the pistons move a slight distance further the valve will be opened allowing the trapped liquid to flow back from the interior of the projection past the valve to the liquid storage space and allowing the rod 225 and the small piston 221 to move relative to the large piston 216 back to the starting position.

While several embodiments of the invention have been shown and described in detail it will be understood that these are illustrative only and are not to be taken as a definition of the scope of the invention reference being had for this purpose to the appended claims.

What is claimed is:

1. A differential cylinder comprising a body formed with a first bore of relatively large diameter and a second bore of smaller diameter aligned with the first bore, a first piston slidable in the first bore, a second piston slidable in the second bore and having an extension projecting slidably through the first piston and adapted to be connected to a load, a connection to supply operating fluid to the second bore at the end thereof remote from the first bore to urge the second piston toward the first bore, the second piston moving out of the second bore to open the first bore to the connection whereby the first piston will be moved, and means operated by initial movement of the first piston to connect the pistons against relative movement whereby the first piston will act through the second piston and its extension on the load.

2. A differential cylinder comprising a body formed with a first bore of relatively large diameter and a second bore of smaller diameter aligned with the first bore, a first piston slidable in the first bore, a second piston slidable in the second bore and having an extension projecting slidably through the first piston and adapted to be connected to a load, a connection to supply operating fluid to the second bore at the end thereof remote from the first bore to urge the second piston toward the first bore, the second piston moving out of the second bore to open the first bore to the connection whereby the first piston will be moved, means operated by initial movement of the first piston to connect the pistons against relative movement whereby the first piston will act through the second piston and its extension on the load, means defining a third bore in the body aligned with the first and second bores and through which the extension of the first piston extends, an annular piston on the extension fitting into the third bore, and a connection to supply operating fluid to the third bore at the side of the annular piston remote from the first and second pistons to move the first and second pistons in the opposite direction.

3. A differential cylinder comprising a body formed with a first bore of relatively large diameter and a second bore of smaller diameter aligned with the first bore, a first piston slidable in the first bore, a second piston slidable in the second bore and having an extension projecting slidably through the first piston and adapted to be connected to a load, a connection to supply operating fluid to the second bore at the end thereof remote from the first bore to urge the second piston toward the first bore, the second piston moving out of the second bore to open the first bore to the connection whereby the first piston will be moved, a tubular projection on the first piston through which the extension of the second piston extends, an annular piston on the extension fitting in the tubular projection and a port to conduct fluid into the tubular projection between the first piston and the annular piston and which is closed by the first piston during initial movement thereof to trap the fluid in the projection thereby to connect the first piston to the extension.

4. A differential cylinder comprising a body formed with a first bore of relatively large diameter and a second bore of smaller diameter aligned with the first bore, a first piston slidable in the first bore, a second piston slidable in the second bore and having an extension projecting slidably through the first piston and adapted to be connected to a load, a connection to supply operating fluid to the second bore at the end thereof remote from the first bore to urge the second piston toward the first bore, the second piston moving out of the second bore to open the first bore to the connection whereby the first piston will be moved, a tubular projection on the first piston through which the extension of the second piston extends, an annular piston on the extension fitting in the tubular projection, the first piston having a passage therein terminating at its periphery and communicating with the interior of the projection, and a port in the side of the first bore communicating with the passage when the first piston is in a position adjacent to the second bore, the passage being closed by the first bore after initial movement of the first piston to trap fluid in the projection thereby to connect the first piston to the extension.

5. A differential cylinder comprising a body formed with a first bore of relatively large diameter and a second bore of smaller diameter aligned with the first bore, a first piston slidable in the first bore, a second piston slidable in the second bore and having an extension projecting slidably through the first piston and adapted to be connected to a load, a connection to supply operating fluid to the second bore at the end thereof remote from the first bore to urge the second piston toward the first bore, the second piston moving out of the second bore to open the first bore to the connection whereby the first piston will be moved, a tubular projection on the first piston through which the extension of the second piston extends, an annular piston on the extension fitting in the tubular projection, the first piston having a passage therein terminating at its periphery and communicating with the interior of the projection, a port in the side of the first bore communicating with the passage when the first piston is in a position adjacent to the second bore, the passage being closed by the first piston after initial movement of the first piston to trap fluid in the projection thereby to connect the first piston to the extension, the body being formed with a third bore in which the projection is slidable, and a connection to supply operating fluid to the third bore to act on the annular piston and the end of the projection to move the first and second pistons in the opposite direction.

6. A differential cylinder comprising a body formed with a first bore of relatively large diameter and a second bore of smaller diameter aligned with the first bore, a first piston slidable in the first bore, a second piston slidable in the second bore and having an extension projecting slidably through the first piston and adapted to be connected to a load, a connection to supply operating fluid to the second bore at the end thereof remote from the first bore to urge the second piston toward the first bore, the second piston moving out of the second bore to open the first bore to the connection whereby the first piston will be moved, a tubular projection on the first piston through which the extension of the second piston extends, an annular piston on the extension fitting in the tubular projection, a closure for the first bore fitting around the projection and defining in the first bore a reservoir space, the first piston having a passage therein terminating at its periphery and communicating with the interior of the projection, and a port in the side of the first bore connecting the passage with the reservoir space when the first piston is in a position adjacent to the second bore and which is of a length to be cut off by the first piston after initial movement thereof.

7. A differential cylinder comprising a body formed with a first bore of relatively large diameter and a second bore of smaller diameter aligned with the first bore, a first piston slidable in the first bore, a second piston slidable in the second bore and having an extension projecting slidably through the first piston and adapted to be connected to a load, a connection to supply operating fluid to the second bore at the end thereof remote from the first bore to urge the second piston toward the first bore, the second piston moving out of the second bore to open the first bore to the connection whereby the first piston will be moved, a tubular projection on the first piston through which the extension of the second piston extends, an annular piston on the extension fitting in the tubular projection, a closure for the first bore fitting around the projection and defining in the first bore a reservoir space, the first piston having a passage therein terminating at its periphery and communicating with the interior of the projection, and a port in the side of the first bore connecting the passage with the reservoir space when the first piston is in a position adjacent to the second bore and which is of a length to be cut off by the first piston after initial movement thereof, the body being formed with a third bore in which the projection slidably fits, and a connection to supply operating fluid to the third bore to act on the annular piston and the end of the projection to move the first and second pistons in the opposite direction.

8. A differential cylinder comprising a body formed with a first bore of relatively large diameter and a second bore of smaller diameter aligned with the first bore, a first piston slidable in the first bore, a second tubular piston slidable in the second bore and extending slidably through the first piston, a fixed plunger rod extending slidably into the second tubular piston, a connection to supply operating fluid to the second bore at the end thereof remote from the first bore to urge the second piston toward the first bore, the second piston moving out of the second bore while remaining on the fixed plunger to open the first bore to the connection whereby the first piston will be moved, a tubular projection on the first piston through which the second piston extends, an annular piston on the second piston fitting slidably in the tubular projection, the first piston having a passage therein terminating at its periphery and communicating with the interior of the projection, and a port in the side of the first bore communicating with the passage when the first piston is in a position adjacent to the second bore and which is cut off by the first piston after initial movement thereof.

9. A differential cylinder comprising a body formed with a first bore of relatively large diameter and a second bore of smaller diameter aligned with the first bore, a first piston slidable in the first bore, a second tubular piston slidable in the second bore and extending slidably through the first piston, a fixed plunger rod extending slidably into the second tubular piston, a connection to supply operating fluid to the second bore at the end thereof remote from the first bore to urge the second piston toward the first bore, the second piston moving out of the first bore, the second piston moving out of the second bore while remaining on the fixed plunger to open the first bore to the connection whereby the first piston will be moved, a tubular projection on the first piston through which the second piston extends, an annular piston on the second piston fitting slidably in the tubular projection, the first piston having a passage therein terminating at its periphery and communicating with the interior of the projection, a closure for the first bore fitting around the projection and defining a reservoir space in the first bore at one side of the first piston, and a port in the side of the first bore connecting the reservoir space with the passage when the first piston is in a position adjacent to the second bore and which is cut off by the first piston after initial movement thereof.

10. A differential cylinder comprising a body formed with a first bore of relatively large diameter and a second bore of smaller diameter aligned with the first bore, a first piston slidable in the first bore, a second tubular piston slidable in the second bore and extending slidably through the first piston, a fixed plunger rod extending slidably into the second tubular piston, a connection to supply operating fluid to the second bore at the end thereof remote from the first bore to urge the second piston toward the first bore, the second piston moving out of the second bore while remaining on the fixed plunger to open the first bore to the connection whereby the first piston will be moved, a tubular projection on the first piston through which the second piston extends, an annular piston on the second piston fitting slidably in the tubular projection, the first piston having a passage therein terminating at its periphery and communicating with the interior of the projection, a closure for the first bore fitting around the projection and defining a reservoir space in the first bore at one side of the first piston, and a port in the side of the first bore connecting the reservoir space with the passage when the first piston is in a position adjacent to the second bore and which is cut off by the first piston after initial movement thereof, the body being formed with a third bore slidably receiving the projection, and a connection to supply operating fluid to the third bore to act on the annular piston and the end of the projection to move the first and second pistons in the opposite direction.

11. A differential cylinder comprising a body formed with a first bore of large diameter and a second bore of smaller diameter aligned with the first bore, a first piston slidable in the first bore, a second piston slidable in the second bore and having an extension projecting slidably through the first piston and adapted to be connected to a load, a connection to supply operating fluid to the second bore at the end thereof remote from the first bore to urge the second piston toward the first bore, the second piston moving out of the second bore to expose the first bore to the connection whereby the first piston will be moved, a tubular projection on the first piston through which the extension extends, an annular piston on the extension fitting into the tubular projection, means forming a passage to conduct fluid into the tubular projection between the first piston and the annular piston, and valve means in said passage closed by initial movement of the first piston.

12. A differential cylinder comprising a body formed with a first bore of large diameter and a second bore of smaller diameter aligned with the first bore, a first piston slidable in the first bore, a second piston slidable in the second bore and having an extension projecting slidably through the first piston and adapted to be connected to a load, a connection to supply operating fluid to the second bore at the end thereof remote from the first bore to urge the second piston toward the first bore, the second piston moving out of the second bore to expose the first bore to the connection whereby the first piston will be moved, a tubular projection on the first piston through which the extension extends, an annular piston on the extension fitting into the tubular projection, means in the first piston forming a passage to conduct fluid into the tubular projection between the first piston and the annular piston, and a valve in the passage having a stem projecting beyond the face of the first piston to engage the end of the first bore to open the valve when the first piston is adjacent to the end of the first bore and to allow the valve to close when the first piston is moved away from the end of the first bore.

GEORGE B. MARSDEN.

No references cited.